US011718719B2

(12) United States Patent
Lernoux et al.

(10) Patent No.: US 11,718,719 B2
(45) Date of Patent: Aug. 8, 2023

(54) ORIENTED FILMS COMPRISING ETHLYENE-BASED POLYMERS AND METHODS OF MAKING SAME

(71) Applicant: ExxonMobil Chemical Patents Inc., Baytown, TX (US)

(72) Inventors: Etienne R. H. Lernoux, Longueville (BE); Giriprasath Gururajan, Missouri City, TX (US); Donald A. Winesett, Houston, TX (US); Stefan B. Ohlsson, Keerbergen (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 839 days.

(21) Appl. No.: 16/341,549

(22) PCT Filed: Oct. 4, 2017

(86) PCT No.: PCT/US2017/055142
§ 371 (c)(1),
(2) Date: Apr. 12, 2019

(87) PCT Pub. No.: WO2018/071250
PCT Pub. Date: Apr. 19, 2018

(65) Prior Publication Data
US 2020/0369841 A1 Nov. 26, 2020

Related U.S. Application Data

(60) Provisional application No. 62/408,282, filed on Oct. 14, 2016.

(30) Foreign Application Priority Data

Dec. 27, 2016 (EP) ..................................... 16206928

(51) Int. Cl.
*C08J 5/18* (2006.01)
*B29C 48/00* (2019.01)
*C08L 23/06* (2006.01)

(52) U.S. Cl.
CPC ............ *C08J 5/18* (2013.01); *B29C 48/0018* (2019.02); *C08L 23/06* (2013.01); *B29C 2948/92152* (2019.02); *B29C 2948/92266* (2019.02); *B29K 2995/005* (2013.01); *B29K 2995/0089* (2013.01); *C08J 2323/06* (2013.01); *C08L 2207/066* (2013.01)

(58) Field of Classification Search
CPC ......... B32B 9/005; B32B 5/022; B32B 38/08; B32B 2307/304; B32B 2457/04; C01B 33/1585; C04B 14/064; C04B 38/009; C04B 41/5089; C04B 41/68; C04B 2111/00844; C04B 2111/28; C04B 2201/30; D06M 11/79; D06M 11/38
USPC ....................................................... 428/220
See application file for complete search history.

(56) References Cited

U.S. PATENT DOCUMENTS

| 6,956,088 B2* | 10/2005 | Farley ..................... B29C 48/92 526/348 |
| 8,247,065 B2 | 8/2012 | Best et al. |
| 2005/0175803 A1* | 8/2005 | Breese .................... B29C 55/06 264/210.1 |
| 2008/0178768 A1* | 7/2008 | Breese .................... B32B 27/30 106/285 |
| 2009/0156764 A1 | 6/2009 | Malakoff et al. |
| 2009/0192270 A1 | 7/2009 | Malakoff et al. |
| 2009/0297810 A1* | 12/2009 | Fiscus ..................... B32B 27/20 428/220 |
| 2013/0266786 A1 | 10/2013 | Malakoff et al. |
| 2014/0205823 A1 | 7/2014 | Yun et al. |
| 2015/0344741 A1* | 12/2015 | Blackwell ............... B32B 27/28 156/60 |
| 2015/0368412 A1* | 12/2015 | Cermelli ................. C08L 23/06 526/348.5 |
| 2015/0368415 A1* | 12/2015 | Fiscus ..................... B32B 27/32 264/177.17 |
| 2016/0032034 A1* | 2/2016 | Farley ................. B29C 48/0017 264/514 |
| 2016/0271917 A1 | 9/2016 | Nummila-Pakarinen et al. |

(Continued)

FOREIGN PATENT DOCUMENTS

| EP | 3040196 A1 * | 7/2016 | ............. B32B 27/00 |
| WO | 2014/081505 A | 5/2014 | |

(Continued)

OTHER PUBLICATIONS

Patel, Rajen M. et al., "Investigation of Processing-Structure-Properties Relationships in Polyethylene Blown Films", Polymer Engineering and Science, vol. 34, No. 19, pp. 1506-1514, Oct. 1994, https://doi.org/10.1002/pen.760341911.

(Continued)

*Primary Examiner* — Travis M Figg
(74) *Attorney, Agent, or Firm* — ExxonMobil Technology and Engineering Company-Chemicals

(57) ABSTRACT

Provided are oriented films comprising linear low density polyethylene polymer and having improved balance of properties including improved machine direction tear strength. The oriented polymer film has at least one layer comprising 50 to 100 wt. % of an ethylene-based polymer. The MDO polymer film has a normalized MD Elmendorf Tear (ASTM D-1922) of at least 40 g/µm. In certain embodiments, the MDO polymer film surprisingly does not tear when MD Elmendorf Tear is measured according to ASTM D-1922.

24 Claims, No Drawings

(56) References Cited

U.S. PATENT DOCUMENTS

| | | | | |
|---|---|---|---|---|
| 2016/0272798 A1* | 9/2016 | Cheng | ............... | C08F 236/20 |
| 2016/0279913 A1* | 9/2016 | Manrique | ............ | B29C 55/04 |
| 2017/0081437 A1* | 3/2017 | Lernoux | ............ | C08F 210/16 |
| 2017/0081444 A1* | 3/2017 | Wang | ................ | C08J 5/18 |
| 2017/0129229 A1* | 5/2017 | Wang | ................ | B32B 27/32 |
| 2017/0198124 A1* | 7/2017 | Li | ................ | C08L 23/0815 |
| 2017/0259541 A1* | 9/2017 | Leano | ............... | C08L 23/08 |

FOREIGN PATENT DOCUMENTS

| | | |
|---|---|---|
| WO | 2014/099356 A | 6/2014 |
| WO | 2015/075081 A | 5/2015 |
| WO | 2016/135213 A | 9/2016 |
| WO | 2016/172099 A | 10/2016 |

OTHER PUBLICATIONS

Krishnaswamy, R.K. et al., Orientation characteristics of LLDPE blown films and their implications on Elmendorf tear performance, vol. 41, Issue 26, pp. 9205-9217, Dec. 15, 2000, https://doi.org/10.1016/S0032-3861(00)00136-1.

\* cited by examiner

US 11,718,719 B2

ORIENTED FILMS COMPRISING ETHLYENE-BASED POLYMERS AND METHODS OF MAKING SAME

CROSS-REFERENCE OF RELATED APPLICATIONS

This application is a National Phase Application claiming priority to PCT Application Serial No. PCT/US2017/055142 filed Oct. 4, 2017, which claims priority to and the benefit of U.S. Provisional Ser. No. 62/408,282 filed Oct. 14, 2016, and EP 16206928.0, filed Dec. 27, 2016, which are incorporated by reference in their entirety.

PRIORITY CLAIM

This application claims priority to and the benefit of U.S. Ser. No. 62/408,282, filed Oct. 14, 2016 and EP 16206928.0, filed Dec. 27, 2016, which are incorporated by reference in their entirety.

FIELD OF THE INVENTION

The present invention is directed to linear low density polyethylene polymers, polymer blends, methods for making the same, and articles made therefrom. In particular, provided are oriented films comprising linear low density polyethylene polymer and having improved balance of properties including improved machine direction tear strength.

BACKGROUND OF THE INVENTION

Linear low density polyethylenes, and blends and articles made therefrom, are generally known in the art. Such polymers and polymer blends have typically been made from a linear low density polyethylene produced using a Ziegler-Natta catalyst in a gas phase process.

Processes for the polymerization of monomers utilizing a bulky ligand hafnium transition metal metallocene-type catalyst compound have been described. The hafnium transition metal metallocene-type catalyst compound used in the process comprises at least one cyclopentadienyl ligand including at least one linear or isoalkyl substituent of at least three carbon atoms.

A single reactor process for the polymerization of monomers to make ethylene polymers utilizing a bulky ligand hafnium transition metal metallocene-type catalyst compound has been described.

Metallocene-catalyzed polyethylenes having relatively broad composition distribution (CDBI) and relatively broad molecular weight distribution, and films produced from such polymers are also known.

Other films produced from polyethylene obtained using a hafnium-based metallocene catalyst and methods for manufacturing the films are also described.

U.S. Application Publication No. 2013/0266786 described films having relatively constant seal strength.

U.S. Application Publication No. 2009/0156764 described films having increased tear resistance.

Additionally, U.S. Pat. No. 6,956,088 teaches conventional knowledge in the polyethylene film art is that by increasing the machine direction (MD) orientation in films, physical properties, such as MD tear strength, will decrease. To this point, in *Polymer Engineering and Science*, mid-October 1994, vol. 34, No. 19, incorporated by reference, the authors discuss processing structure properties relationships in polyethylene blown film. The authors suggest that MD Elemendorf tear is found to be inversely related to draw ratio (analogous to the amount of MD orientation) and MD shrinkage. Further, in *Polymer*, 41 (2000) 9205-9217, incorporated by reference, the authors suggest that at high MD extension rates, a greater number of molecules will be oriented along the MD prior to the onset of crystallization, and that this is detrimental from a MD tear performance perspective.

Still further, it is generally understood that the higher draw ratio (more MD orientation) increases shrink which can negatively affect sealing. Dart impact also tends to be negatively impacted by increased MD orientation which can lead to packaging integrity issues.

The disclosure of International Publication Number WO 2016/135213 describes machine direction orientation (MDO) processing applied to bimodal PE terpolymers laminated with HDPE.

U.S. Application Publication No. 2014/0205823 discloses a biaxial oriented film having an ultimate elongation at least 1.5 times greater in the MD as compared to the cross direction (CD).

U.S. Application Publication No. 2015/0368415 describes polyethylene films having increased MD tear resistance up to 1000 g/mil.

Other references of interest include U.S. Pat. No. 6,956,088; WO 2014/081505; U.S. Pat. No. 8,247,065; and U.S. Application Publication No. 2016/0271917.

While many documents describe processes and polymers using the same monomers as those described herein and similar processes to those described herein, there still remains a need for polyethylene compositions having improved balance of properties. More particularly, there remains a need for films having desirable MD tear strength.

SUMMARY OF THE INVENTION

Described herein are oriented polymer films, methods to produce the oriented polymer films, and articles made from the oriented polymer films. The oriented polymer films comprise an ethylene-based polymer that provides improved toughness. It has been discovered that orienting polymer films containing the ethylene-based polymer in the machine direction surprisingly improves the machine direction (MD) tear. This application is directed to orientation of polymer films after the polymer in the film is no longer in its molten state and has solidified having a crystalline structure.

In one aspect, the invention relates to a machine direction oriented (MDO) polymer film. The oriented polymer film has at least one layer comprising 50 to 100 wt. % of an ethylene-based polymer. The ethylene-based polymer has: i) a melt index ($I_{2.16}$) of from about 0.1 g/10 min to about 10.0 g/10 min; ii) a melt index ratio ($I_{21.6}/I_{2.16}$) of from about 15 to about 45; iii) a weight average molecular weight (Mw) of from about 20,000 to about 200,000; iv) a molecular weight distribution (Mw/Mn) of from about 2.0 to about 5.0; v) a Mz/Mw ratio of from 1.7 to about 3.5; and vi) a density of from 0.900 to 0.925 g/cm$^3$. The MDO polymer film has a normalized MD Elmendorf Tear (ASTM D-1922) of at least 20 g/μm. In embodiments, the MDO polymer film has a MD Elmendorf Tear of at least 300 g. In certain embodiments, the MDO polymer film surprisingly does not tear when MD Elmendorf Tear is measured.

Another aspect of the invention relates to a method to produce a machined direction oriented (MDO) polymer film where the polymer film has at least one layer comprising 50 to 100 wt. % of an ethylene-based polymer. The ethylene-based polymer has: i) a melt index ($I_{2.16}$) of from about 0.1 g/10 min to about 10.0 g/10 min; ii) a melt index ratio ($I_{21.6}/I_{2.16}$) of from about 15 to about 45; iii) a weight average molecular weight (Mw) of from about 20,000 to about 200,000; iv) a molecular weight distribution (Mw/Mn) of from about 2.0 to about 5.0; v) a Mz/Mw ratio of from 1.7 to about 3.5; and vi) a density of from 0.900 to 0.925 g/cm$^3$. The polymer film is stretched in the machine direction to produce a MDO polymer film having a normalized MD Elmendorf Tear of at least 20 g/µm.

DETAILED DESCRIPTION OF THE INVENTION

Various specific embodiments, versions, and examples are described herein; including exemplary embodiments and definitions that are adopted for purposes of understanding the claimed invention. While the following detailed description gives specific preferred embodiments, those skilled in the art will appreciate that these embodiments are exemplary only and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference, the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

The term "substantially free" as used herein means<10 wt. %. Some embodiments that are substantially free of a component have<5.0 wt. %, <3.0 wt. %, <2.0 wt. %, 1.0 wt. %, <0.5 wt. %, or <0.1 wt. % of the recited component. Some embodiments are essentially free of the recited component, meaning that the recited component is present at a level of <0.05 wt. % or the component is not purposely added to the composition.

Unless otherwise indicated, the distribution and the moments of molecular weight (Mw, Mn, Mw/Mn, etc.), the comonomer content (C2, C3, C6, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. Given amount of polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant determined with PE or PP standards. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1} \log M_{PS},$$

where the variables with subscript "PS" stand or polystyrene while those without a subscript are for the test samples. In this method, αPS=0.67 and KPS=0.000175, while α and K are for other materials as calculated and published in literature (Sun, T. et al. Macromolecules 2001, 34, 6812), except that for purposes of this invention and the claims thereto, a and K are 0.695 and 0.000579 respectively for ethylene polymers; α and K are 0.705 and 0.0002288 respectively for propylene polymers; and α and K are 0.695 and 0.000579* (1-0.0075*wt % hexene comonomer) respectively for ethylene-hexene copolymer.

The comonomer composition is determined by the ratio of the IR5 detector intensity corresponding to CH2 and CH3 channel calibrated with a series of PE and PP homo/copolymer standards whose nominal value are predetermined by NMR or FTIR.

The LS detector is the 18-angle Wyatt Technology High Temperature DAWN HELEOSII. The LS molecular weight (M) at each point in the chromatogram is determined by analyzing the LS output using the Zimm model for static light scattering (Light Scattering from Polymer Solutions; Huglin, M. B., Ed.; Academic Press, 1972):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, A2 is the second virial coefficient, P(θ) is the form factor for a monodisperse random coil, and Ko is the optical constant for the system:

$$K_o = \frac{4\pi^2 n^2 (dn/dc)^2}{\lambda^4 N_A},$$

where NA is Avogadro's number, and (dn/dc) is the refractive index increment for the system. The refractive index, n=1.500 for TCB at 145° C. and λ=665 nm. For the ethylene-hexene copolymers analyzed, dn/dc=0.1048 ml/mg and A2=0.0015.

A high temperature Agilent viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the equation $[\eta]=\eta s/c$, where c is concentration and is determined from the IR5 broadband channel output. The viscosity MW at each point is calculated as $$M = K_{PS} M^{\alpha_{PS}+1}/[\eta],$$

where $\alpha ps$ is 0.67 and Kps is 0.000175.

The branching index (g'vis) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of this invention and claims thereto, $\alpha$=0.695 and K=0.000579 for linear ethylene polymers, $\alpha$=0.705 and K=0.000262 for linear propylene polymers, $\alpha$=0.695 and K=0.000181 for linear butene polymers, and $\alpha$ is 0.695 and K is 0.000579*(1−0.0075*wt % hexene comonomer) for ethylene-hexene copolymer. Concentrations are expressed in g/cm³, molecular weight is expressed in g/mole, and intrinsic viscosity is expressed in dL/g unless otherwise noted.

Composition distribution breadth index ("CDBI") is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF).

The broadness of the composition distribution of the polymer may be characterized by $T_{75}$-$T_{25}$. TREF is measured using an analytical size TREF instrument (Polymerchar, Spain), with a column of the following dimensions: inner diameter (ID) 7.8 mm, outer diameter (OD) 9.53 mm, and column length of 150 mm. The column may be filled with steel beads. 0.5 mL of a 4 mg/ml polymer solution in orthodichlorobenzene (ODCB) containing 2 g BHT/4 L were charge onto the column and cooled from 140° C. to −15° C. at a constant cooling rate of 1.0° C./min. Subsequently, ODCB may be pumped through the column at a flow rate of 1.0 ml/min, and the column temperature may be increased at a constant heating rate of 2° C./min to elute the polymer. The polymer concentration in the eluted liquid may then be detected by means of measuring the absorption at a wavenumber of 2941 cm¹ using an infrared detector. The concentration of the ethylene-α-olefin copolymer in the eluted liquid may be calculated from the absorption and plotted as a function of temperature. As used herein, $T_{75}$-$T_{25}$ values refer to where $T_{25}$ is the temperature in degrees Celsius at which 25% of the eluted polymer is obtained and $T_{75}$ is the temperature in degrees Celsius at which 75% of the eluted polymer is obtained via a TREF analysis. For example, in an embodiment, the polymer may have a $T_{75}$-$T_{25}$ value from 5 to 10, alternatively, a $T_{75}$-$T_{25}$ value from 5.5 to 10, and alternatively, a $T_{75}$-$T_{25}$ value from 5.5 to 8, alternatively, a $T_{75}$-$T_{25}$ value from 6 to 10, and alternatively, a $T_{75}$-$T_{25}$ value from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

"Melt index" is determined according to ASTM D-1238-E (190° C./2.16 kg), also sometimes referred to as $I_{2.16}$. High load melt index is determined according to ASTM D-1238-F (190° C./21.6 kg), also sometimes referred to as $I_{21.6}$. The term melt index ratio refers to the ratio of the high load melt index to the melt index (i.e., $I_{21.6}/I_{2.16}$).

Density, reported in grams per cubic centimeter (g/cm³), was determined using chips cut from plaques compression molded in accordance with ASTM D-1928 Procedure C, aged in accordance with ASTM D-618 Procedure A, and measured as specified by ASTM D-1505. "Density" as used herein, and unless otherwise specified, refers to the density of the polymer independent of any additives, such as antiblocks, which may change the tested value.

1% Secant Modulus (M), reported in MPa, is measured as specified by ASTM D-882.

Tensile Strength at Break, reported in MPa, is measured as specified by ASTM D-882.

Tensile Elongation at Break, reported in %, is measured as specified by ASTM D-882.

Dart A Impact or Dart Drop Impact Strength (DIS), reported in grams (g) and/or grams per micron(g/μm), is measured using a smooth black phenolic head, material C, as specified by ASTM D-1709, method A.

Elmendorf Tear values are determined in accordance with ASTM D-1922. This method is widely used as index of the tearing resistance of plastic film in packaging applications and is considered a standard industry tool. The samples were tested on the type 60-2600 Protear Electronic Elemendorf Tear Tester manufactured by Thwing-Albert Instrument CO. The tear range of the 2600 Protear model varies from 200 g to 6400 g. This testing range is made possible by the use of 2 pendulums (200 g and 1600 g) and augmenting weights that can be fixed to the pendulums and increase their weight to 400 g or 800 g for the 200 pendulum, and 3200 g or 6400 g for the 1600 g pendulum. Tear Strength is reported in grams (g) and/or divided by film gauge to provide a normalized value in grams per micron (g/μm).

Films with very high resistance to tear propagation can exceed the capability of the 60-2600 Protear Electronic Elemendorf Tear Tester equipped with the 1600 g pendulum and the augmenting weight of 6400 g. In such a case, the pendulum typically goes all the way up to its climax without full tear of the film sample, which shows both tearing and deformation. When this very high resistance to tear is reached, the tear force of the film is reported as superior to 6400 g (>6400 g). Under such circumstances, using higher weights than 6400 g would not result into full sample tear as the pendulum has reached its maximum height. This force can also be divided by the film gauge to provide a normalized value in grams per micron (g/μm).

Peak puncture force, reported in milliNewtons (mN) and/or divided by film gauge to provide a normalized value in milliNewtons per micron (mN/μm), is determined according to CEN 14471, with a steel probe diameter of 0.8 mm. Puncture Energy at Break is reported in milliJoules (mJ) and/or divided film gauge to provide a normalized value in milliJoules per micron (mJ/μm).

Gauge, reported in μm or mil, is measured using a Measuretech Series 200 or a Heidenhain instrument. The instrument measures film thickness using a capacitance gauge. For each film sample, ten film thickness datapoints are measured per inch of film as the film is passed through the gauge in a transverse direction. From these measurements, an average gauge measurement is determined and reported. Where any of the above properties are reported in pounds per square inch, grams per μm, or in any other dimensions that are reported per unit area or per unit thickness, the ASTM methods cited for each property have been followed except that the film gauge is measured in accordance with ASTM D-374, Method C.

45° Gloss is measured as specified by ASTM D2457.

Haze is reported as a percentage and is measured as specified by ASTM D1003.

Where applicable, the properties and descriptions below are intended to encompass measurements in both the machine and transverse directions. Such measurements are reported separately with the designation "MD" indicating a measurement in the machine direction and "TD" indicating a measurement in the transverse direction.

Orientation refers to the alignment of polymer chains in the film.

Draw ratio through an MDO unit is the ratio of film length before MD orientation to the film length after MD orientation. This is stated, for example, as a draw ratio of 4, where 4 represents the film length after MD orientation relative to a film of unit length before MD orientation, i.e., the film has been stretched to 4 times the original length.

Methods of Making Oriented Films

As discussed above, it had been believed that orientation in the machine direction negatively affected MD tear strength. Surprisingly, the ethylene based polymers described herein provide oriented films that have desirable MD tear properties. Thus, one aspect of the invention provides a method of producing a film and then increasing the MD tear of the produced film by orienting (which involves stretching) the crystalline film in the machine direction to increase the film's machine direction orientation which surprisingly results in an oriented film having increased MD tear.

Thus, in particular embodiments, the invention provides a method to produce a machined direction oriented (MDO) polymer film comprising stretching a polymer film comprising an ethylene-based polymer in the machine direction as an additional step after the film has been made to produce a MDO polymer film having a normalized MD Elmendorf Tear of at least 20 g/μm.

Some methods of producing a polymer film suitable for machine direction orientation (MD orientation) subsequent to the film making may be blown and cast film methods. Particular blown film methods include extruding the polyethylene composition through an annular die to form an extruded tube of molten material to provide the tube with a tube diameter which is substantially the annular die diameter. At the same time, continuously extruding the tube, expanding the tube, downstream of said annular die, to attenuate the walls thereof to form the tube of molten material into a bubble of a bubble diameter which exceeds (i) the annular die diameter, and (ii) the tube diameter. The bubble has a frost line which comprises a demarcation line between the molten material and crystalline film.

Some films suitable for MD orientation described herein are made by a cast film process. Typically, in a cast film process, forming the polyethylene composition into a film includes melt extruding the polyethylene composition through a flat or slot die to form an extrudate that is continuously moved onto a polished turning roller, where it is quenched from one side. The speed of the roller controls the draw ratio and final film thickness. Increased speed/draw ratio reduces final film thickness. The film may then be then sent to a second roller for cooling on the other side. Typically, although not necessarily, the film passes through a system of rollers and is wound onto a roll. Most flat dies are of T-slot or coat hanger designs, which contain a manifold to spread the flowing polymer across the width of the die, followed downstream by alternating narrow and open slits to create the desired flow distribution and pressure drop.

Suitable blown film and cast film process are described in detail in "Plastics Films" by John H. Briston, Longman Scientific and Technical, 1986, which is incorporated herein by reference in its entirety.

Films suitable for MD orientation have a gauge (or thickness as defined above) before MD orientation ranging from 10 to 120 μm. The lower limit of film gauge before MD orientation can be 10, 15, 20, 25, 30, 40, 45, 50, 60, 70, or 80 μm. The upper limit on gauge before MD orientation can be 120, 110, 100, 90, 80, 70, 60, 50, 40, 35, 30, 25, or 20 μm. Any combination of lower and upper limits (where upper limit>lower limit) should be considered to be disclosed by the above limits, e.g., 20 to 110 μm, 30 to 100 μm, 30 to 90 μm, 40 to 110 μm, 40 to 100 μm, etc. In certain preferred embodiments, the film before MD orientation has gauge ≤50 μm, e.g., ≤49 μm, ≤48 μm, ≤47 μm, ≤46 μm, ≤45, ≤40, ≤35, ≤30, ≤25, or ≤20 μm. In certain preferred embodiments, the film before MD orientation has gauge 25 to 40 μm.

This application is directed to orientation of polymer films formed by either cast or blown processes after the film polymer is no longer in its molten state and has solidified having a crystalline structure. MD orientation can be achieved by any known MD orientation process either in-line or off-line with the extrusion on cast films or blown films. That is, the film produced by blown or cast process can either be temporarily stored (off-line) before MD orientation or can be fed directly (in-line) to the MD orientation equipment.

Orientation methods may be with or without heat added. Cold drawing or stretching are suitable methods. When the film is heated, no case will the polymer be heated above its melting temperature.

A preferred MD orientation process can consist of heating the film to an orientation temperature, preferably using a set of temperature controlled rollers. The orientation temperature may be up to the polymer's melt temperature. Next the heated film is fed into a slow drawing roll with a nip roller, which has the same rolling speed as the heating rollers. The film then enters a fast drawing roller having a speed that is, for example, 1.5 to 12 times faster than the slow draw roll, which effectively orients (stretches) the film on a continuous basis. The oriented film then enters annealing thermal rollers, which allow stress relaxation by holding the film at an elevated temperature for a period of time. The annealing temperature is preferably within, or slightly below (e.g., 10 to 20° C. below but not lower than room temperature, for purposes here room temperature is 23° C.), the same temperature range as used for stretching. Finally, the film is cooled through cooling rollers to an ambient temperature to produce a machine direction oriented (MDO) film.

The draw ratio can be from 1.1 to 12, e.g., from 1.5 to 6.0, from 1.5 to 4.5, or from 2 to 3.

The MDO film can have a gauge after MD orientation ranging from 10 to 110 µm. The lower limit of film gauge after MD orientation can be 10, 15, 20, 25, 30, 40, 50, 60, 70, or 80 µm. The upper limit on gauge after MD orientation can be 110, 100, 80, 70, 60, 50, 40, 30, 25, or 20 µm. Any combination of lower and upper limits, where upper limit is > lower limit, should be considered to be disclosed by the above limits, e.g., 10 to 100 µm, 10 to 50 µm, 30 to 90 µm, 40 to 110 µm, 40 to 100 µm, etc.

Oriented Films

Another aspect of the invention relates to machine direction oriented (MDO) polymer film having a normalized MD Elmendorf Tear of at least 20 g/µm as described above. Additional properties of the MDO polymer films are described here.

The MD Elmendorf Tear of the MDO polymer film can range from ≥300 g to values that are beyond the capabilities of the Elmendorf tester using the specified method, due to the fact that the energy of the pendulum is absorbed by the sample deformation and, if some tearing occurs, the sample does not tear entirely, even when the highest weight (6400 g) is used. In this case, values were reported as "does not tear" or ">6400 g". The MD Elmendorf Tear of the MDO polymer film can be ≥300 g, for example, ≥350, 400, 450, 500, 600, 750, 1000, 1500, 2000, 3000, 4000, 5000 or ≥6400 g. Embodiments of the MDO polymer film do not tear when MD Elmendorf Tear is measured according to ASTM D-1922.

Similarly, the normalized MD Elmendorf Tear of the MDO polymer film can range from 20 g/µm to values that are beyond the capabilities of the Elmendorf tester using the specified method. Normalized values reported for does not tear examples are calculated by dividing 6400 g by the gauge of the film. The normalized MD Elmendorf Tear of the MDO polymer film can be ≥20 g/µm, for example, ≥30, 40, 45, 50, 80, 85, 100, 150, 200, 250, 300, 325, 350, 375, 400, 425, 450, 475, 500, 550, or ≥575 g/µm. Embodiments of the MDO polymer film do not tear when MD Elmendorf Tear is measured according to ASTM D-1922.

The TD tear of the films is surprisingly desirable after MD orientation. The normalized TD Elmendorf Tear of the MDO polymer film (measured by ASTM D-1922) can range from 20 g/µm to values that are beyond the capabilities of the Elmendorf tester using the specified method. Normalized values reported for does not tear examples are calculated by dividing 6400 g by the gauge of the film. The normalized TD Elmendorf Tear of the MDO polymer film can be ≥20 g/µm, for example, ≥30, 40, 45, 50, 80, 85, 100, 150, 200, 250, 300, 325, 350, 375, 400, 425, 450, 475, 500, 550, or ≥575 g/µm. Embodiments of the MDO polymer film do not tear when TD Elmendorf Tear is measured according to ASTM D-1922.

Dart A Impact Strength of the oriented films can be ≥200 g, e.g., ≥225, ≥250, ≥275, ≥300, ≥400, ≥500, ≥750, ≥1000 g. The Dart A Impact Strength of the oriented films, normalized (per unit film thickness), can be ≥20 g/µm, e.g., ≥24, ≥26, ≥28, ≥30, ≥35, ≥40, ≥45, ≥50 g/µm.

Peak puncture force of the oriented films can be ≥2500 mN, e.g., ≥2700, ≥2900, ≥3000, ≥3500, ≥4000, ≥4500, or ≥5000 mN. Peak puncture force for the oriented films, normalized (per unit of film thickness), can be ≥90 mN/µm, e.g., ≥100, ≥110, ≥120, ≥130, ≥140, ≥150, ≥160, ≥180, ≥200, ≥225, or ≥240 mN/µm.

Tensile Break Elongation of the MDO films can be ≥50%, e.g., ≥60, ≥70, ≥80, ≥100, ≥140, ≥150, ≥175, ≥190, ≥200, ≥250, ≥275, ≥300, ≥350, ≥400, or ≥45%.

Ethylene-based Polymer

The ethylene-based polymer compositions described herein, are particularly useful in monolayer films. Such films show a surprising combination of properties after orientation in the machine direction. For example, the oriented films can surprisingly have a surprising combination of MD Elmendorf Tear value, Dart A Impact strength, and balance of other desirable properties. Such oriented films are useful in a number of applications.

When used in multilayer films, the polymer compositions described herein, particularly the ethylene-based polymer, may be used in any layer of the film, or in more than one layer of the film, as desired. When more than one layer of the film comprises such a polymer composition, each such layer can be individually formulated, i.e., the layers comprising such a polymer composition can be the same or different within the scope of the claims, depending upon the desired properties of the film.

The term "film" may refer to monolayer or multilayer structures. A film may be formed by any suitable means, e.g., extrusion molding, cast, or blown film techniques. When used in multilayer films, the various polymers described herein can be used in any layer of the film unless otherwise indicated. Multilayer films may be made by processes wherein each layer is individually or separately formulated; i.e., the layers formed of or including the polymer composition can have the same or different chemical composition, density, melt index, thickness, etc., depending upon the desired properties of the film. Similarly, orientation may be applied to individual layers separately or to a combined multilayer film.

To facilitate discussion of different film structures of the invention, the following notation is used herein. Each layer of a film is denoted "A" or "B", where "A" indicates one film layer, preferably an inner film layer, and "B" indicates a different film layer. Where a film includes more than one A layer or more than one B layer, one or more prime symbols (', ", "', etc.) are appended to the A or B symbol to indicate layers of the same type (conventional or inventive) that can be the same or can differ in one or more properties, such as chemical composition, density, melt index, thickness, and the like, within the range of the parameters defined herein. Finally, the symbols for adjacent layers are separated by a slash (/). Using this notation, a three-layer film having an inner layer, which is also referred to herein as a "core layer" disposed between two outer film layers, the layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the thickness of an A/B/A' film having A and A' layers of 10 microns each and a B layer of 30 microns is denoted as 20/60/20.

Consistent with this understanding of multilayer structures, the description focuses on the compositions and properties of a Layer A, but such layers may be used as a monolayer film or combined with other layers to form a multilayer film, e.g., further comprising a Layer B in surface contact with a first side of Layer A; and Layer C in surface contact with a second side of Layer A. The compositions of Layers B and C may be the same or different and may be selected according to the desired performance criteria.

Thus, some embodiments provide a machine direction oriented (MDO) polymer film having at least one layer comprising 50 to 100 wt. % of an ethylene-based polymer having: i) a melt index ($I_{2.16}$) of from about 0.1 g/10 min to about 10.0 g/10 min; ii) a melt index ratio ($I_{21.6}/I_{2.16}$) of from about 15 to about 45; iii) a weight average molecular weight (Mw) of from about 20,000 to about 200,000; iv) a molecular weight distribution (Mw/Mn) of from about 2.0 to about 4.5; v) a Mz/Mw ratio of from 1.7 to about 3.5; and vi) a density of from 0.900 to 0.925 g/cm$^3$. The MDO polymer film has a normalized MD Elmendorf Tear of at least 20 g/μm.

In particular such embodiments, the lower limit on the amount of ethylene-based polymer composition in Layer A may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 95.0 wt. %, 97.5 wt. %, 99.0 wt. %, 99.5 wt. % or 100.0 wt. %. The upper limit on the amount of ethylene-based polymer in Layer A may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 95.0 wt. %, 97.5 wt. %, 99.0 wt. %, 99.5 wt. % or 100.0 wt. %. Any combination lower and upper limits should be considered to be disclosed by the above limits, e.g., 55.0 to 95.0 wt. %, 75.0 to 90.0 wt. %, 90.0 to 99.0 wt. %, 95.0 to 97.5 wt. %, etc. Higher amounts are generally preferred. All amounts are based on the total weight of Layer A.

The ethylene based polymer composition has a hafnium: zirconium (ppm/ppm) ratio>1.0. The hafnium:zirconium ratios and concentrations described herein are those ratios and concentrations associated with catalyst residues and do not include hafnium or zirconium form other intentional or inadvertent sources. In particular embodiments, the ethylene-based polymer composition described herein includes <5.0 ppm hafnium, generally less than 2.0 ppm hafnium, preferably less than 1.5 ppm hafnium, more preferably less than 1.0 ppm hafnium. In an embodiment, the composition contains from about 0.01 ppm to about 2 ppm hafnium, preferably in the range of from about 0.01 ppm to about 1.5 ppm hafnium, more preferably in the range of from about 0.01 ppm to 1.0 ppm hafnium. While zirconium generally is present as an impurity in hafnium, it will be realized in some embodiments where particularly pure hafnium-containing catalysts are used, the amount residual of zirconium from the catalyst may be extremely low, resulting in an undetectable amount of zirconium in the ethylene-based polymer. Thus, the upper limit on the ratio of hafnium to zirconium in the polymer can be 50.0, 100.0, 200.0, 500.0, or more. But in other embodiments, the ratio of hafnium:zirconium (ppm/ ppm) is ≤2.0, ≤10.0, ≤15.0, ≤17.0, ≤20.0, or ≤ about 25.0.

While the ethylene-based polymer compositions useful in the films described herein, generally have a CDBI<50.0%, some have a CDBI preferably 20.0% to <50.0%, or 20.0% to <40.0%, or 20.0% to 35.0%. In another embodiment, the ethylene-based polymer composition has a CDBI of from 35.0% to 45.0% or from 25.0% to 28.0%.

The ethylene-base polymer composition has a linear structure that is consistent with a branching index, $g'_{vis}$≥0.98. Some suitable polymer compositions have a $g'_{vis}$≥0.985, ≥0.99, ≥0.995, or 1.0. While such values are indicative of little to no long-chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

The branching index $g'_{vis}$ is inversely proportional to the amount of branching. Thus, lower values for g' indicate relatively higher amounts of branching. The amounts of short and long-chain branching each contribute to the branching index according to the formula: $g'_{vis}=g'_{LCB} \times g'_{SCB}$.

The ethylene-based polymer compositions useful in Layer A have one or more of the following features.

The ethylene-based polymer composition of Layer A typically comprises at least 50.0 mole % of polymer units derived from ethylene. In some embodiments, the lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. Ethylene-based polymers of the invention can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. Ethylene-based polymers generally have less than 50.0 mole % of polymer units derived from a C3 to C20 olefin, preferably an alpha-olefin. The lower limit on the range of C3 to C20 olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. The upper limit on the range of $C_3$ to $C_{20}$ olefin content may be 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. In some embodiments, low $C_3$ to $C_{20}$ olefin contents, e.g., 0.0-5.0 mole % are preferred. Comonomer content is based on the total content of all monomers in the polymer.

While any $C_3$ to $C_{20}$ olefin may be used, alpha-olefins are preferred, particularly $C_4$ to $C_8$ alpha-olefins, e.g., butene-1, pentene-1,4-methyl-1-pentene, hexene-1, octene-1, more preferably butene-1, hexene-1 and octene-1, most preferably hexene-1. Ethylene-based polymers having more than two types of monomers, such as terpolymers, are intended to be included within the term "polymer" or "copolymer" as used herein.

The ethylene-based polymers in certain embodiments have a melt index (MI) or ($I_{2.16}$) of about 0.1 to about 300 g/10 min., preferably about 0.1 to about 100 g/10 min., about 0.1 to about 50 g/10 min., about 0.1 g/10 min. to about 5.0 g/10 min., about 0.2 to 1.5 g/10 min., about 0.3 to 1.0 g/10 min., 0.5 to 1.0 g/10 min., 0.6 to 1.0 g/10 min., 0.7 to 1.0 g/10 min., or 0.75 to 0.95 g/10 min., particularly about 0.8 g/10 min.

Some ethylene-based polymers have a melt index ratio ($I_{21.6}/I_{2.16}$) of from about 10.0 to about 50.0. The polymers, in a preferred embodiment, have a melt index ratio of from about 15.0 to about 45.0, more preferably from about 18.0 to about 40.0, about 16 to about 30.0, from about 22 to about 38, or from about 20 to about 35.

The weight average molecular weight ($M_w$) may be from about $1.50 \times 10^4$ to about $2.50 \times 10^5$ g/mol. Preferably, the weight average molecular weight is from about $2.00 \times 10^4$ to about $2.00 \times 10^5$ g/mol, or from about $2.50 \times 10^4$ to about $1.50$ $2.00 \times 10^5$ g/mol.

The ethylene-based polymers have a molecular weight distribution ($M_w/M_n$) of from about 1.5 to about 5.0, particularly from about 2.0 to about 4.5, about 2.0 to about 4.0, preferably from about 3.0 to about 4.0. The ratio of the z-average molecular weight (Mz) to weight average molecular weight ($M_w$) may be > about 1.5 or > about 1.7 or > about 2.0. In one embodiment, this ratio is from about 1.7 to about 3.5. In yet another embodiment, this ratio is from about 2.0 to about 3.0, or from about 2.2 to about 3.0.

The density may be in the range of from 0.860 g/cm$^3$ to 0.970 g/cm$^3$, preferably in the range of from 0.900 g/cm$^3$ to 0.965 g/cm$^3$, more preferably in the range of from 0.905 g/cm$^3$ to 0.955 g/cm$^3$, 0.910 g/cm$^3$ to 0.955 g/cm$^3$, or from 0.910 to 0.925 g/cm$^3$. In some embodiments, ethylene-based polymer has a density of about 0.900 to about 0.925 g/cm$^3$, from about 0.905 to about 0.925 g/cm$^3$, from about 0.912 to about 0.925 g/cm$^3$, from about 0.915 to about 0.921 g/cm$^3$, or about 0.916 to 0.918 g/cm$^3$.

Preferably, the ethylene-based polymer is one having at least a first peak and a second peak in a comonomer distribution analysis. In some preferred embodiments, the first peak has a maximum at a $\log(M_w)$ value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis may have a maximum at a $\log(M_w)$ value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

Preferably, ethylene-based polymers of these embodiments exhibit a $2^{nd}$ melt temperature of from about 100° C. to about 130° C., or about 110° C. to about 130° C., or from about 119° C. to about 123° C. Preferably, ethylene-based polymers of these embodiments exhibit a first melt temperature of from about 95° C. to about 125° C., or from about 100° C. to about 118° C., or from about 107° C. to about 110° C.

Particular ethylene-based polymers have at least a first peak and a second peak in a comonomer distribution analysis, wherein the first peak has a maximum at a $\log(M_w)$ value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a $\log(M_w)$ value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min. to about 5.0 g/10 min.; a melt index ratio of from about 15 to about 30; a $M_w$ of from about $2.00 \times 10^4$ to about $2.00 \times 10^5$ g/mol; a $M_w/M_n$ of from about 2.0 to about 4.5; and a density of from 0.910 to 0.925 g/cm$^3$. More preferred polymers also have therein an amount of hafnium that is > the amount of zirconium, particularly a ratio of hafnium: zirconium (ppm/ppm) is at least 2.0, at least 10.0, at least 15.0, at least 17.0, at least 20.0, or at least about 25.0.

Ethylene-based polymers typically have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt. %. In some embodiments a substantially uniform comonomer <8.0 wt. %, <5.0 wt. %, or <2.0 wt. %. Both a substantially uniform and an orthogonal comonomer distribution can be determined using fractionation techniques such as gel permeation chromatography-differential viscometry (GPC-DV), temperature rising elution fraction-differential viscometry (TREF-DV) or cross-fractionation techniques.

Polymerization processes for making ethylene-based polymer described herein are disclosed in U.S. Pat. No. 6,956,088, including use of a hafnium transition metal metallocene-type catalyst system as described in U.S. Pat. Nos. 6,242,545 and/or 6,248,845, particularly Example 1, hereby incorporated by reference.

While the polymerization processes are described therein, certain features are reproduced here for convenience.

As described therein, polymerization catalyst in a supported form, for example, deposited on, bonded to, contacted with, or incorporated within, adsorbed or absorbed in, or on, a support or carrier may be used. The metallocene catalyst may be introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be >4 hours, but shorter times are suitable.

The substituted bulky ligand hafnium transition metal metallocene-type catalyst compounds and catalyst systems discussed above are suited for the polymerization of monomers, and optionally one or more comonomers, in any polymerization process, solution phase, gas phase or slurry phase. Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100-500 psig (680-3448 kPag), or in the range of from 200-400 psig (1379-2759 kPag), or in the range of from 250-350 psig (1724-2414 kPag). The reactor temperature may vary between 60-120° C., or 60-115° C., or in the range of from 70-110° C., or in the range of from 70-95° C., or 70-90° C. The productivity of the catalyst or catalyst system is influenced by the main monomer partial pressure. The mole percentage of the main monomer, ethylene, is from 25.0-90.0 mole %, or 50.0-90.0 mole %, or 70.0-85.0 mole %, and the monomer partial pressure is in the range of from 75-300 psia (517-2069 kPa), or 100-275 psia (689-1894 kPa), or 150-265 psia (1034-1826 kPa), or 200-250 psia (1378-1722 kPa), typical conditions in a gas phase polymerization process.

Other gas phase processes contemplated by the process of the invention include those described in U.S. Pat. Nos. 5,627,242; 5,665,818; and 5,677,375; and European publications EP-A-0 794 200; EP-A-0 802 202; and EP-B-634 421, all of which are herein fully incorporated by reference.

It may be beneficial to operate in the substantial absence of or essentially free of any scavengers, such as triethylaluminum, trimethylaluminum, triisobutylaluminum and tri-n-hexylaluminum and diethyl aluminum chloride and the like. This process is described in WO 96/08520, which is herein fully incorporated by reference.

A slurry polymerization process generally uses pressures in the range of 1 to 50 atmospheres and even greater and temperatures in the range of 0° C. to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Hexane or isobutane medium may be employed.

Ethylene-based polymers may be prepared by a process referred to as a particle form, or slurry process where the temperature is kept below the temperature at which the polymer goes into solution. Such technique is well known in the art, see for instance U.S. Pat. No. 3,248,179, which is fully incorporated herein by reference. The temperature in the particle form process is within the range of 85-110° C. (185-230° F.) Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Typical reactors for producing ethylene-based polymers are capable of producing >500 lbs/hr (227 Kg/hr) to 200,000 lbs/hr (90,900 Kg/hr) or higher of polymer, or >1000 lbs/hr (455 Kg/hr), or >10,000 lbs/hr (4540 Kg/hr), or >25,000 lbs/hr (11,300 Kg/hr), or >35,000 lbs/hr (15,900 Kg/hr), or >50,000 lbs/hr (22,700 Kg/hr), or >65,000 lbs/hr (29,000 Kg/hr) to >100,000 lbs/hr (45,500 Kg/hr).

Persons having skill in the art will recognize that the above-described processes may be tailored to achieve desired ethylene-based polymer resins. For example, comonomer to ethylene concentration or flow rate ratios are commonly used to control resin density. Similarly, hydrogen to ethylene concentrations or flow rate ratios are commonly used to control resin molecular weight. In both cases, higher levels of a modifier result in lower values of the respective resin parameter. Gas concentrations may be measured by, for example, an on-line gas chromatograph or similar apparatus to ensure relatively constant composition of recycle gas streams.

Additionally, the use of a process continuity aid, while not required, may be desirable in preparing the ethylene-based polymers, particularly for large-scale production. Such continuity aids are well known to persons of skill in the art and include, for example, metal stearates.

Additional Polymers

Layer A may optionally include one or more other polymer, particularly polyolefin, more particularly polyethylene, compositions. Such compositions may be present in Layer A in an amount of 0 to 50.0 wt. %. The lower limit on the range of amounts in Layer A may be 50.0 wt. %, 45.0 wt. %, 40.0 wt. %, 35.0 wt. %, 30.0 wt. %, 25.0 wt. %, 20.0 wt. %, 15.0 wt. %, 10.0 wt. %, 5.0 wt. %, 2.5 wt. %, 1.0 wt. %, 0.5 wt. % or 0.0 wt. %. The upper limit on the amount of ethylene-based polymer in Layer A may be 50.0 wt. %, 45.0 wt. %, 40.0 wt. %, 35.0 wt. %, 30.0 wt. %, 25.0 wt. %, 20.0 wt. %, 15.0 wt. %, 10.0 wt. %, 5.0 wt. %, 2.5 wt. %, 1.0 wt. %, 0.5 wt. % or 0.0 wt. %. Any combination lower and upper limits should be considered to be disclosed by the above limits, e.g., 5.0 to 45.0 wt. %, 10.0 to 25.0 wt. %, 1.0 to 10.0 wt. %, 2.5 to 5.0 wt. %, etc. All amounts are based on the total weight of Layer A.

One exemplary such polymer is a heterogeneously branched linear polyethylene having a $g'_{vis} \geq 0.98$. The term "heterogeneously branched linear ethylene polymer" refers to a polymer having polymer units derived from ethylene and preferably at least one $C_3$ to $C_{20}$ alpha-olefin and having a CDBI≤50.0%. Typically such polymers are the result of a Ziegler polymerization process. Such polymers are also referred to as LLDPEs, more particularly sometimes as ZN LLDPEs.

Heterogeneously branched linear ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear.

Some heterogeneously branched linear ethylene polymers have lower amounts of the highly branched fraction, but have a greater amount of the medium branched fraction. While ATREF will show homogeneously branched ethylene polymers typically are characterized by a single relatively narrow peak at some elution temperature, some heterogeneously branched ethylene polymers have a broad branching distribution, as represented by the breadth of elution temperatures over which the polymer fractions elute. Such polymers may also have a distinct peak at an elution temperature characteristic of a "linear", "high density" or "crystalline" polymer fraction.

Another exemplary polymer composition comprises ethylene copolymer having at least 50 wt. % ethylene-derived units and up to 50 wt. %, preferably 1 wt. % to 35 wt. %, even more preferably 1 wt. % to 6 wt. % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm$^3$ (preferably 0.915 to 0.930 g/cm$^3$, preferably 0.915 to 0.923 g/cm$^3$), a CDBI of 60% to 80%, preferably between 65% and 80%, and a melt index, 12.16 of about 0.5 to 5.0 g/10 min. Preferably these polymers are metallocene polyethylenes (mPEs). Such ethylene copolymers are available from ExxonMobil Chemical Company under the tradename Exceed™ mPEs.

Yet another exemplary suitable polymer that may be present in Layer A along with the ethylene-based polymer composition is an ethylene copolymer comprising units derived from ethylene and at least one alpha olefin having at least 5 carbon atoms, having a melt index of from 0.1 to 15; a CDBI of at least 70%, and a density of 0.910 to 0.950 g/cm$^3$ (preferably 0.915 to 0.940 g/cm$^3$, preferably 0.918 to 0.923 g/cm$^3$), a melt index of about 0.1 to 3.0 g/min. Some such ethylene copolymers have a $0.87 \leq g'_{vis} \leq 0.97$. Some such mPEs are available from ExxonMobil Chemical Company under the tradename Enable™ mPE resins.

Another exemplary suitable additional polymer that may be present in Layer A along with the ethylene-based polymer is a polyethylene having $0.50 \leq g'_{vis} \leq 0.85$. In some embodiments, Layer A also comprises a polyethylene having a lower limit on the $g'_{vis}$ of about 0.55, 0.60, 0.65, 0.70, 0.74, 0.75, 0.77, 0.80, 0.82, or 0.85. The upper limit on the $g'_{vis}$ of additional polyethylenes that are suitable to form Layer A may be 0.57, 0.60, 0.65, 0.70, 0.74, 0.75, 0.77, 0.80, 0.82, or 0.85. Any combination lower and upper limits should be considered to be disclosed by the above limits, e.g., 0.55 to 0.85, 0.70 to 0.85, 0.65 to 0.80, 0.65 to 0.70, etc.

The Layer A may also comprise a high pressure polyethylene homopolymer or copolymer, which may or may not have a branching index within a particular range. Such polyethylenes are typically made by a tubular process, although autoclave reactors can also be used. The overall process is a free-radical polymerization in a tube reactor containing a process fluid, where the process fluid partially comprised of ethylene and the ethylene, including any comonomer, is converted to polymer in a highly exothermic reaction. The reaction occurs under high operating pressure (about 1000 bar to 4000 bar) in turbulent process fluid flow conditions at maximum temperatures of about 160° C. to about 360° C. The reaction initiation temperature, the temperature in which the monomer (and optional comonomer) to polymer conversion is initiated (or in the case where there are multiple reaction points along the reaction tube, reinitiated), is from about 120° C. to about 240° C. Typical single-pass conversion values for a tubular reactor range from about 20 to about 40 percent. The resulting low density polyethylene is highly branched and typically has ≥50.0 mole % polymer units derived from ethylene and, optionally, one or more comonomers, e.g., vinyl acetate (sometimes referred to as "LDPE," "HPPE," or "EVA copolymer"). Certain embodiments that can have improved optical properties additionally comprise LDPE in the Layer A ethylene-based polymer.

Additives can be provided in the various film layers, as is well-known.

Applications

The MDO films described herein are useful in a variety of applications, some of which are described below. The invention is not limited to solely these applications.

A film application area to take benefit of film properties after MDO is general packaging. High tear and dart impact performance and excellent puncture are features that are often very important when packing food or non-food products, especially when downgauging. These properties can be coupled with the improved MD modulus expected from the MD orientation. A packaging application of particular interest is lamination, for which the MDO PE film can be used on the external side of the laminated structure (often reverse printed), on the internal side (sealing side in contact with the content) and/or inside the laminated structure in case it contains 3 plies or more. The high modulus can offer higher resistance to elongation in processes involving tension such as solventless lamination, or involving tension and heat such as printing or solvent-based lamination. Higher modulus also brings higher bending stiffness, which is often beneficial for packaging efficiencies and deliver more body to the packaging, i.e., enhanced shelf appeal. So the MDO films described herein can deliver thin packaging films that are very strong, stiff and advantageous for printing or lamination.

The films described herein can also be useful for large PE sacks, such as heavy duty sacks used to pack polymer pellets, fertilizers, grains and others. The machine orientation after film making is expected to bring excellent tensile properties, including improved creep resistance, while the linear low density polyethylene polymers of this invention will maintain dart impact performance at excellent levels and bring enhanced package integrity.

Another application area where the invention can significantly contribute is breathable backsheet for hygiene applications. Machine orientation of films with heavy loading of fillers typical in hygiene applications can generate cavitation and breathability. The typical gauges of non MDO films in this application fall most often in the 35 µm-50 µm range, while the range of gauge for MDO films is typically 12-25 µm. The increased MD tear performance and high puncture resistance provided by the MDO films described herein, combined with the high modulus coming from the MDO, is believed to be of great advantage in these applications.

Another application that can take advantage of the invention is hand-wrap films. Hand-wrap stretch films available in the market can be regular (i.e., not pre-stretched), or pre-stretched (i.e., MD oriented by passing the film through an MDO unit, either in-line with the film making or offline). In both cases, they are built so that the operator experiences continuously increasing force when stretching the film and wraps pallets with a moderate and uniform stretching. The stretch levels applied to the film during the wrapping operation is typically in the 50%-100% range for regular hand-wrap films, and less than 30% for pre-stretched hand-wrap films.

For regular hand-wrap films, MDO films described herein at moderate draw ratios can deliver excellent (>20 g/µm) MD tear and puncture resistance while maintaining a sufficient level of stretch ability. Preferred embodiments most useful in these applications are those with a pre-MDO film gauge ≤50 µm. Additional preferred embodiments have a pre-MDO film gauge in the range 25 to 40 µm, with draw ratios from 2 to 3. Also, the additional stretching made during the hand-wrap operation is expected boost MD tear performance further. Higher draw ratios specified herein can deliver very thin (5-10 µm) MDO films, for hand-wrap pre-stretched applications.

Silage stretch wrap films can also utilize the MDO films herein to enhance tear and puncture. The typical gauge of silage stretch film is around 25 µm. MD orientation can be performed on a 30-50 µm thick film to bring it to the required gauge, either 25 µm for improvement of properties, or to thinner gauge, such as 20 µm, in order to down-gauge and still improve properties. An optimized MD stretching should deliver MD tear values which are largely superior to the 8 g/μm to 12 g/μm conventionally used in this application area. Also, the stretching during the wrapping of the bale is expected to boost MD tear further. Further, it is also known that MDO stretching can improve barrier performance to, e.g., water vapor or oxygen. Such improved barrier performance improvement combined with the improved mechanical properties, MD tear in particular, offers desirable down-gauging opportunities.

The toughness of coextruded films containing layers of barrier polymers such as ethylene vinyl alcohol (EVOH) and/or polyamide (PA) is known to suffer from machine orientation after film making. MDO films made of linear low density polyethylene polymers of this invention and of one or more layers of barrier polymers can therefore show enhanced toughness.

Other applications for the inventive films described herein will be apparent to one of ordinary skill in the art wherever the improved MD tear, Dart, and other properties are advantageous.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

Exceed™ XP 8656ML Performance Polymer resin is commercially available from ExxonMobil Chemical Company, Houston, Tex. This polymer has a density of 0.916, g/cm$^3$, a melt index ($I_{2.16}$) of 0.5 g/10 min, a melt index ratio ($I_{21.6}/I_{2.16}$) of 30.

Exceed™ XP 8656ML monolayer films were fabricated using a Hosokawa Alpine blown film extrusion line with the conditions: 204° C. (400° F.) melt temperature, 2.25 mm (90 mil) die gap, 2.5 BUR, 25 μm (1 mil) gauge and a 0.85 kg/hr/mm-diameter (15.16 lbs/hr/in circumference) die factor. The calculated MD strain rate $((V_f-V_0)/FLH)$ for the fabrication of the film was 1.72 s$^{-1}$, where $V_f$ is the take-up speed in cm/s of the film at frost line, $V_0$ is the linear speed of the polymer at the exit of the die in cm/s and the frost line height FLH is the distance in cm between the exit of the die and the frost line. Films were tested under unstretched (comparative), 50% stretched and 100% stretched conditions. The stretching was done in the machine direction (MD) at the room temperature (23±2° C. and 50%±10% relative humidity) using an internal cling stretching frame. First, the film is placed facing upward on the stretching frame (inside surface up) with one end attached to the clamping device, while the other end rolled on to the stretching rod. Then, two marks five inches apart were made on the films and the film is stretched, so that the stretch distance between marks were at 19.1 cm (7.5 inch) and 25.4 cm (10 inch) to obtain 50% and 100% elongation respectively. The stretched films were allowed to sit for least 30 minutes before cutting samples for testing. A total of 12 specimens of each material; six in the machine direction (MD) and six in the transverse direction (TD) were tested.

Data in Example 1 for tear test of films in the machine and transverse direction was carried out using a ProTear Elmendorf Tearing Tester with method based on the ASTM D 1922-15 method.

Similarly, tensile data in Example 1 for 1% Secant Modulus, MPa (psi) was determined using a method based on ASTM-D882-10. The test was conducted on the United testing systems, Six (6) station, and 60 Degree machine.

Table 1 shows the MD and TD tear resistance of Exceed XP films that are subjected to 0%, 50% and 100% elongation and corresponding tear characteristics. MD elongation (stretching) increases MD tear performance. An average MD tear of 26.4 g/μm is measured on the film samples with 0% elongation. But non-failures are observed when the film is drawn to 50% and 100% elongation. Additionally, 100% elongation shows more non-failures than 50%. Non-failure is defined as the condition when the sample does not fail at the maximum load (6400 g) in the tear tester. Samples elongated up to 100% show increased non-failure (6 out of 10) in both MD and TD directions indicating that the cold-drawing of the films lead to increased tear resistance that surpass the capacity of the tear tester.

TABLE 1

| | | MD and TD Tear | | | |
|---|---|---|---|---|---|
| Sample | Gauge μm (mil) | Average MD Tear g/μm (g/mil) | MD Tear Characteristics | Average TD Tear g/μm (g/mil) | TD Tear Characteristics |
| Exceed XP 8656 Film - 0% Elongation (comparative) | 25.3 (1.01) | 26.4 (661.3) | All 10 samples failed with extended tears | 22.9 (573.5) | All 10 samples failed with extended tears |
| Exceed XP 8656 Film - 50% Elongation | 24 (0.96) | — | 4 out of 10 films show non-failure* | 35.3 (881.4) | All 10 samples failed with extended tears |
| Exceed XP 8656 Film - 100% Elongation | 21.5 (0.86) | — | 6 out of 10 films show non-failure* | — | 6 out of 10 films show non-failure* |

*Greater than the test capacity @ pendulum weight of 6400 grams.

Table 2 shows the tensile properties of the Exceed XP films that are subjected to 0%, 50% and 100% elongation. The combination of enhanced MD and TD tear performance as well as MD tensile strength for the stretched films makes it unique for applications such as food packaging, liquid packaging, heavy duty trash bags or other applications that require both exceptional tear resistance and tensile strength.

TABLE 2

MD and TD Tensile Properties

| Sample | | Gauge μm (mils) | Tensile Strength MPa (psi) | Yield Strength MPa (psi) | Elongation (%) |
|---|---|---|---|---|---|
| Exceed XP 8656 Film-0 | MD | 27 (1.08) | 66.5 (9,638) | 9.8 (1,414) | 271 |
| % Elongation (comparative) | TD | 27 (1.08) | 55.2 (8,006) | 9.0 (1,307) | 613 |
| Exceed XP 8656 Film-50 | MD | 23.8 (0.95) | 68.8 (9,983) | 9.2 (1,330) | 221 |
| % Elongation | TD | 24 (0.96) | 53.8 (7,808) | 7.8 (1,134) | 631 |
| Exceed XP 8656 Film-100 | MD | 22.3 (0.89) | 91.8 (13,316) | 11.5 (1,666) | 178 |
| % Elongation | TD | 22 (0.88) | 39.7 (5,759) | 7.8 (1,136) | 615 |

Example 2

Exceed™ XP 8656ML Performance Polymer resin was evaluated along with Exceed™ mPE 1018HA mLLDPE grade available from ExxonMobil Chemical Company, Houston, Tex. and Dowlex 2045G available from The Dow Chemical Company.

Polyethylene blown films were made by 3-layer Jinming blown film line running the same polymer in all 3 layers to form a co-extruded monofilm. Jinming line has a die diameter of 180 mm and die gap of 1.5 mm. Outer and inner extruders had a diameter of 60 mm with a L/D ratio of 30:1 and the core extruder had a diameter of 90 mm, with a L/D ratio of 30:1. The processing conditions were as described in Table 3.

TABLE 3

(Pre-MDO) Film Processing Conditions on Blown Line

| Polymer | Exceed XP 8656ML | Exceed 1018HA | Dowlex 2045G | Exceed XP 8656ML | Exceed 1018HA | Dowlex 2045G |
|---|---|---|---|---|---|---|
| Gauge target | 50 μm | 50 μm | 50 μm | 80 μm | 80 μm | 80 μm |
| Die diameter | 180 mm | 180 mm | 180 mm | 180 mm | 180 mm | 180 mm |
| Die gap | 1.5 mm | 1.5 mm | 1.5 mm | 1.5 mm | 1.5 mm | 1.5 mm |
| Air ring temp. | 20° C. | 20° C. | 19° C. | 20° C. | 20° C. | 19° C. |
| IBC fan temp. | 11° C. | 11° C. | 9° C. | 11° C. | 11° C. | 9° C. |
| Melt temp. | 200° C. | 200° C. | 200° C. | 200° C. | 200° C. | 200° C. |
| Output | 119 kg/h | 121 kg/h | 121 kg/h | 119 kg/h | 121 kg/h | 121 kg/h |
| BUR | 2.7 | 2.5 | 2.7 | 2.7 | 2.5 | 2.7 |
| Frost line height | 700 mm | 700 mm | 700 mm | 600 mm | 600 mm | 600 mm |
| Calculated Strain rate on blown line | 0.60 $s^{-1}$ | 0.66 $s^{-1}$ | 0.61 $s^{-1}$ | 0.41 $s^{-1}$ | 0.45 $s^{-1}$ | 0.41 $s^{-1}$ |

Films produced as described and according to Table 3 were subsequently subjected to machine direction orientation to produce examples E1-E24. Comparative examples C1-C6 were not subjected to any machine direction orientation. MD orientation was performed on a MDO unit from Hosokawa Alpine AG, type 20/11, equipped with 4 preheating rolls, 2 orientation rolls, 3 annealing rolls and 2 cooling rolls. The main settings for each of these rolls were as follows.

| | | | Roll speeds | |
|---|---|---|---|---|
| Roll # | Roll function | Roll temp. [° C.] | 80 μm Dowlex 2045G film | All 50 μm films 80 μm Exceed 8656ML film 80 μm Exceed HA film XP |
| 1 | Preheating 1 | 100 | 9.0 m/min | 10.0 m/min |
| 2 | Preheating 2 | 108 | 9.2 m/min | 10.2 m/min |
| 3 | Preheating 3 | 108 | 9.5 m/min | 10.5 m/min |
| 4 | Preheating 4 | 108 | 9.7 m/min | 10.8 m/min |
| 5 | Orientation 1 | 108 | 10.2 m/min | 11.4 m/min |
| 6 | Orientation 2 | 108 | variable (roll # 5 speed + 50%, 150%, 250%, 350%) | |
| 7 | Annealing 1 | 108 | 95% of roll # 6 | |
| 8 | — | — | 98% of roll # 7 | |
| 9 | Annealing 2 | 105 | 99% of roll # 8 | |
| 10 | Cooling 1 | 60 | same as roll # 9 | |
| 11 | Cooling 2 | 35 | same as roll # 9 | |

Each of the example films was mono-axially stretched on the MDO unit at orientation levels: 1:1.5 (50%), 1:2.5 (150), 1:3.5 (250%) and 1:4.5 (350%).

Elmendorf MD tear performance for these examples is found in Table 4. The film made of Exceed XP 8656ML shows significantly increased MD tear, e.g., ≥20 g/m, after MD orientation. Example MDO films E2-E4, E8, and E12 could not be torn fully with a pendulum weight of 6400 grams.

bound by any theory, this surprising discovery may be related to thinner gauge pre-MDO films having more MD orientation introduced during the blown process than thicker gauge pre-MDO films.

Examples E17-E24 indicate films made of Exceed 1018HA did not show increased MD tear values (e.g., 20 g/μm) in the range of MDO draw ratios tested (1 to 4.5).

Examples E9-E16 indicate films made of Dowlex 2045G can develop increased MD tear, but only with thinner pre-MDO film gauge (here 50 μm) and with higher MDO draw ratio (here example E12 having MDO draw ratio of 4.5).

Table 5 below contains TD Elmendorf tear data of comparative films C1a-C6a and example MDO films E1a-E24a. Note: The "a" in the example numbers in Table 5 indicates films of similar composition and preparation corresponding to films C1-C4 and E1-E24 but possibly having different thickness (gauge). For example, comparative film C2 had gauge of 83 μm while C2a had gauge of 84 μm, but both films had same composition and were prepared in the same manner.

Exceed XP 8656ML example MDO films E1a-E4a and E5a-E8a show a positive impact of MD elongation on TD tear, up to a certain draw ratio after which TD tear starts decreasing. Dowlex 2045G example MDO films E9a-E12a

TABLE 4

Elmendorf MD tear performance of films at various MDO draw ratios

| | | Film gauge before MDO = 50 μm | | | | | Film gauge before MDO = 80 μm | | | | |
|---|---|---|---|---|---|---|---|---|---|---|---|
| Exceed XP 8656ML | | C1 | E1 | E2 | E3 | E4 | C2 | E5 | E6 | E7 | E8 |
| MDO Draw Ratio | | none | 1.5 | 2.5 | 3.5 | 4.5 | none | 1.5 | 2.5 | 3.5 | 4.5 |
| Gauge | μm | 50 | 33 | 20 | 14 | 11 | 83 | 57 | 34 | 22 | 17 |
| Elmendorf tear MD | g | 376 | 386 | >6400 | >6400 | >6400 | 761 | 187 | 180 | 27 | >6400 |
| Elmendorf tear MD normalized | g/μm | 7.5 | 11.9 | >320 | >457 | >582 | 9.1 | 3.3 | 5.4 | 1.2 | >376 |
| Dowlex 2045G | | C3 | E9 | E10 | E11 | E12 | C4 | E13 | E14 | E15 | E16 |
| MDO Draw Ratio | | none | 1.5 | 2.5 | 3.5 | 4.5 | none | 1.5 | 2.5 | 3.5 | 4.5 |
| Gauge | μm | 52 | 35 | 21 | 15 | 12 | 84 | 57 | 37 | 23 | 17 |
| Elmendorf tear MD | g | 781 | 584 | 321 | 238 | >6400 | 1421 | 241 | 259 | 65 | 195 |
| Elmendorf tear MD normalized | g/μm | 15.0 | 17.0 | 15.0 | 16.2 | >533 | 17.0 | 4.2 | 6.9 | 2.9 | 11.2 |
| Exceed 1018HA | | C5 | E17 | E18 | E19 | E20 | C6 | E21 | E22 | E23 | E24 |
| MDO Draw Ratio | | none | 1.5 | 2.5 | 3.5 | 4.5 | none | 1.5 | 2.5 | 3.5 | 4.5 |
| Gauge | μm | 48 | 32 | 20 | 13 | 10 | 75 | 51 | 31 | 22 | 16 |
| Elmendorf tear MD | g | 534 | 105 | 65 | 29 | 95 | 910 | 227 | 45 | 18 | 12 |
| Elmendorf tear MD normalized | g/μm | 11.2 | 3.3 | 3.3 | 2.1 | 9.2 | 12.2 | 4.4 | 1.5 | 0.8 | 0.7 |

Data of table shows increased MD ear, e.g., ≥20 g/μm, can be reached with a 50 μm pre-MDO film, at a gauge between 33 μm and 20 μm (see examples E1 and E2 having MDO draw ratio of 1.5 and 2.5 respectively). Whereas for an 80 μm pre-MDO film, increased MD tear is reached between 22 μm and 17 μm (see examples E7 and E8 having MDO draw ratio of 3.5 and 4.5 respectively).

The data in Table 4 suggests that thicker post-MDO films having increased MD tear can be achieved by using a pre-MDO film having a thinner gauge, e.g., having a pre-MDO film gauge ≤80, 70, 60, or ≤50 μm. Without being show a similar trend. Example MDO films E13a-E24a do not show a decrease in TD tear in the range of draw ratios investigated.

The MD tear data of Table 4 and TD tear data of Table 5 data demonstrate that some combinations of pre-MDO film gauges and MDO draw ratios can deliver MDO films with exceptional tear resistance in both MD and TD directions. This exceptional tear resistance in both directions can exceed the capability of the ProTear Elmendorf Tearing Tester with a pendulum weight of 6400 grams, as shown by example MDO films E2 and E2a.

TABLE 5

Elmendorf TD tear performance of films at various MDO draw ratios

| Exceed XP8656ML | | Film gauge before MDO = 50 μm | | | | | Film gauge before MDO = 80 μm | | | | |
|---|---|---|---|---|---|---|---|---|---|---|---|
| | | C1a | E1a | E2a | E3a | E4a | C2a | E5a | E6a | E7a | E8a |
| MDO Draw Ratio | | none | 1.5 | 2.5 | 3.5 | 4.5 | none | 1.5 | 2.5 | 3.5 | 4.5 |
| Gauge | μm | 50 | 31 | 20 | 15 | 11 | 84 | 57 | 32 | 22 | 17 |
| Elmendorf tear TD | g | 651 | 861 | >6400 | 391 | 97 | 1096 | 1114 | 1194 | >6400 | 400 |
| Elmendorf tear TD normalized | g/μm | 13.0 | 27.5 | >320 | 26.6 | 8.8 | 13.1 | 19.5 | 37.1 | >291 | 23.4 |
| Dowlex 2045G | | C3a | E9a | E10a | E11a | E12a | C4a | E13a | E14a | E15a | E16a |
| MDO Draw Ratio | | none | 1.5 | 2.5 | 3.5 | 4.5 | none | 1.5 | 2.5 | 3.5 | 4.5 |
| Gauge | μm | 52 | 34 | 20 | 13 | 11 | 82 | 54 | 31 | 22 | 18 |
| Elmendorf tear TD | g | 1102 | >6400 | >6400 | >6400 | 187 | 1741 | >6400 | >6400 | >6400 | >6400 |
| Elmendorf tear TD normalized | g/μm | 21.3 | >188 | >320 | >492 | 16.5 | 21.2 | >118 | >207 | >291 | >356 |
| Exceed 1018HA | | C5a | E17a | E18a | E19a | E20a | C6a | E21a | E22a | E23a | E24a |
| MDO Draw Ratio | | none | 1.5 | 2.5 | 3.5 | 4.5 | none | 1.5 | 2.5 | 3.5 | 4.5 |
| Gauge | μm | 48 | 30 | 19 | 13 | 10 | 72 | 51 | 31 | 23 | 18 |
| Elmendorf tear TD | g | 668 | >6400 | >6400 | >6400 | >6400 | 1029 | 1579 | >6400 | >6400 | >6400 |
| Elmendorf tear TD normalized | g/μm | 13.9 | >213 | >337 | >492 | >640 | 14.3 | 31.0 | >207 | >278 | >356 |

Table 6 contains dart impact performance of comparative films C1b-C6b and example MDO films E1b-E24b. Note: The "b" in the example numbers in Table 6 indicates films of similar composition and preparation corresponding to films C1-C4 and E1-E24 but possibly having different thickness (gauge). For example, comparative film C2 had gauge of 83 μm while C2b had gauge of 81 μm, but both films had same composition and were prepared in the same manner.

Comparative films C1b and C2b of Exceed XP 8656ML have much higher dart impact strength than comparative films C3b and C4b of Dowlex 2045G and comparative films C5b and C6b of Exceed 8HA. Dart impact forces go beyond the measurement limit of dart impact method A for C1b and C2b films.

Data for example MDO films E1b-E4b, E5b-E8b, E9b-E12b, E13b-16b, E17b-E20b and E21b-E24b in Table 5 indicates the dart impact strength of all films is reduced with MD orientation. However, it can be seen that example films E1b-4b and 5b-8b of Exceed XP still demonstrate higher dart strength than corresponding MDO films of Dowlex 2045G or Exceed 1018HA.

TABLE 6

Dart impact performance of films at various MDO draw ratios

| Exceed XP 8656ML | | Film gauge before MDO = 50 μm | | | | | Film gauge before MDO = 80 μm | | | | |
|---|---|---|---|---|---|---|---|---|---|---|---|
| | | C1b | E1b | E2b | E3b | E4b | C2b | E5b | E6b | E7b | E8b |
| MDO Draw Ratio | | none | 1.5 | 2.5 | 3.5 | 4.5 | none | 1.5 | 2.5 | 3.5 | 4.5 |
| Gauge | μm | 50 | 32 | 18 | 13 | 11 | 81 | 58 | 31 | 20 | 15 |
| Dart impact | g | >2000 | 1054 | 595 | 388 | 225 | >2000 | >2000 | 412 | 382 | 565 |
| Dart impact, normalized | g/μm | >40 | 32.9 | 33.1 | 29.9 | 20.4 | >24.7 | >34.5 | 13.3 | 19.1 | 37.7 |
| Dowlex 2045G | | C3b | E9b | E10b | E11b | E12b | C4b | E13b | E14b | E15b | E16b |
| MDO Draw Ratio | | none | 1.5 | 2.5 | 3.5 | 4.5 | none | 1.5 | 2.5 | 3.5 | 4.5 |
| Gauge | μm | 50 | 34 | 19 | 14 | 11 | 82 | 55 | 29 | 22 | 17 |
| Dart impact | g | 322 | 135 | 65 | 51 | 50 | 511 | 243 | 111 | <63 | 79 |
| Dart impact, normalized | g/μm | 6.4 | 4.0 | 3.4 | 3.6 | 4.5 | 6.2 | 4.4 | 3.8 | <2.9 | 4.7 |
| Exceed 1018HA | | C5b | E17b | E18b | E19b | E20b | C6b | E21b | E22b | E23b | E24b |
| MDO Draw Ratio | | none | 1.5 | 2.5 | 3.5 | 4.5 | none | 1.5 | 2.5 | 3.5 | 4.5 |
| Gauge | μm | 51 | 30 | 17 | 13 | 10 | 72 | 49 | 27 | 21 | 18 |
| Dart impact | g | 1033 | 153 | 54 | 41 | 145 | 1342 | 319 | 105 | 59 | 78 |
| Dart impact, normalized | g/μm | 20.3 | 5.1 | 3.2 | 3.1 | 14.5 | 18.6 | 6.5 | 3.9 | 2.8 | 4.3 |

Table 7 indicates needle puncture strength of comparative films C1c-C6c and example MDO films E1c-E24c. Note: The "c" in the example numbers in Table 7 indicates films of similar composition and preparation corresponding to films C1-C4 and E1-E24 but possibly having different thickness (gauge). For example, comparative film C1 had gauge of 50 μm while C1c had gauge of 51 μm, but both films had same composition and were prepared in the same manner.

Data in Table 7 indicates MD orientation at higher draw ratio results in higher normalized peak puncture force and higher normalized energy at break. Exception to this is the normalized energy at break of example MDO films E1c-E4c, which remains stable in the range of draw ratio tested. The peak puncture force and energy at break of Exceed XP 8656ML example MDO films Ecb-E4c and E5c-E8c are superior to those of Dowlex 2045G MDO films E9c-E12c and E13c-E16c.

TABLE 7

Needle puncture performance of films at various MDO draw ratios

| | | Film gauge before MDO = 50 μm | | | | | Film gauge before MDO = 80 μm | | | | |
|---|---|---|---|---|---|---|---|---|---|---|---|
| Exceed XP 8656ML | | C1c | E1c | E2c | E3c | E4c | C2c | E5c | E6c | E7c | E8c |
| MDO Draw Ratio | | none | 1.5 | 2.5 | 3.5 | 4.5 | none | 1.5 | 2.5 | 3.5 | 4.5 |
| Gauge | μm | 51 | 33 | 18 | 13 | 11 | 85 | 55 | 31 | 21 | 17 |
| Peak puncture force | mN | 4875 | 3816 | 2741 | 2562 | 2648 | 5954 | 5140 | 3943 | 3569 | 3830 |
| Peak puncture force, normalized | mN/μm | 96 | 116 | 152 | 197 | 241 | 70 | 93 | 127 | 170 | 225 |
| Energy at break | mJ | 20 | 14 | 7 | 6 | 4 | 20 | 17 | 12 | 9 | 8 |
| Energy at break, normalized | mJ/μm | 0.40 | 0.43 | 0.42 | 0.44 | 0.42 | 0.24 | 0.32 | 0.37 | 0.42 | 0.45 |
| Dowlex 2045G | | C3c | E9c | E10c | E11c | E12c | C4c | E13c | E14c | E15c | E16c |
| MDO Draw Ratio | | none | 1.5 | 2.5 | 3.5 | 4.5 | none | 1.5 | 2.5 | 3.5 | 4.5 |
| Gauge | μm | 52 | 32 | 20 | 14 | 10 | 82 | 53 | 32 | 22 | 17 |
| Peak Puncture force | mN | 2895 | 2483 | 2185 | 2099 | 2106 | 3997 | 3437 | 3203 | 2858 | 2918 |
| Peak Puncture, normalized | mN/μm | 56 | 78 | 109 | 150 | 211 | 49 | 65 | 100 | 130 | 172 |
| Energy at break | mJ | 9 | 7 | 5 | 5 | 3 | 12 | 10 | 9 | 7 | 7 |
| Energy at break, normalized | mJ/μm | 0.17 | 0.23 | 0.27 | 0.34 | 0.35 | 0.15 | 0.18 | 0.27 | 0.32 | 0.39 |
| Exceed 1018HA | | C5c | E17c | E18c | E19c | E20c | C6c | E21c | E22c | E23c | E24c |
| MDO Draw Ratio | | none | 1.5 | 2.5 | 3.5 | 4.5 | none | 1.5 | 2.5 | 3.5 | 4.5 |
| Gauge | μm | 47 | 28 | 16 | 12 | 9 | 76 | 49 | 35 | 20 | 16 |
| Peak puncture force | mN | 3347 | 2594 | 2395 | 2322 | 2767 | 5331 | 4434 | 3660 | 3270 | 3408 |
| Peak puncture force, normalized | mN/μm | 71 | 93 | 150 | 194 | 307 | 70 | 90 | 105 | 164 | 213 |
| Energy at break | mJ | 12 | 8 | 6 | 6 | 6 | 20 | 16 | 11 | 8 | 7 |
| Energy at break, normalized | mJ/μm | 0.25 | 0.29 | 0.40 | 0.46 | 0.64 | 0.26 | 0.33 | 0.32 | 0.42 | 0.47 |

Table 8 indicates MD tensile properties of comparative films C1d-C6d and example MDO films E1d-24d. Data in Table indicates MD orientation at higher draw ratio results in higher MD modulus and lower MD elongation at break. Note: The "d" in the example numbers in Table 8 indicates films of similar composition and preparation corresponding to films C1-C4 and E1-E24 but possibly having different thickness (gauge). For example, comparative film C1 had gauge of 50 μm while C1d had gauge of 49 μm, but both films had same composition and were prepared in the same manner.

TABLE 8

MD tensile properties of films at various MDO draw ratios

| | | Film gauge before MDO = 50 μm | | | | | Film gauge before MDO = 80 μm | | | | |
|---|---|---|---|---|---|---|---|---|---|---|---|
| Exceed XP 8656ML | | C1d | E1d | E2d | E3d | E4d | C2d | E5d | E6d | E7d | E8d |
| MDO Draw Ratio | | none | 1.5 | 2.5 | 3.5 | 4.5 | none | 1.5 | 2.5 | 3.5 | 4.5 |
| Gauge | μm | 49 | 29 | 19 | 12 | 10 | 84 | 51 | 30 | 21 | 17 |
| 1% Modulus MD | MPa | 200 | 232 | 289 | 446 | 692 | 199 | 216 | 261 | 344 | 474 |
| Tensile strength @ break MD | MPa | 70 | 98 | 154 | 218 | 252 | 65 | 86 | 131 | 184 | 217 |
| Elongation @break MD | % | 493 | 275 | 147 | 77 | 28 | 574 | 368 | 196 | 118 | 56 |
| Dowlex 2045G | | C3d | E9d | E10d | E11d | E12d | C4d | E13d | E14d | E15d | E16d |
| MDO Draw Ratio | | none | 1.5 | 2.5 | 3.5 | 4.5 | none | 1.5 | 2.5 | 3.5 | 4.5 |
| Gauge | μm | 54 | 34 | 21 | 14 | 12 | 80 | 55 | 33 | 22 | 18 |
| 1% Modulus MD | MPa | 228 | 248 | 319 | 491 | 640 | 235 | 236 | 283 | 368 | 526 |
| Tensile strength @ break MD | MPa | 56 | 83 | 121 | 174 | 200 | 52 | 69 | 104 | 142 | 168 |
| Elongation @break MD | % | 696 | 378 | 182 | 99 | 53 | 757 | 467 | 242 | 153 | 83 |
| Exceed 1018HA | | C5d | E17d | E18d | E19d | E20d | C6d | E21d | E22d | E23d | E24d |
| MDO Draw Ratio | | none | 1.5 | 2.5 | 3.5 | 4.5 | none | 1.5 | 2.5 | 3.5 | 4.5 |
| Gauge | μm | 45 | 32 | 19 | 13 | 10 | 73 | 49 | 34 | 20 | 17 |
| 1% Modulus MD | MPa | 211 | 254 | 351 | 485 | 651 | 218 | 243 | 305 | 426 | 549 |
| Tensile strength @ break MD | MPa | 66 | 93 | 134 | 205 | 235 | 55 | 86 | 123 | 158 | 226 |
| Elongation @break MD | % | 624 | 375 | 169 | 110 | 41 | 654 | 459 | 274 | 135 | 93 |

Table 9 shows the total haze and gloss (45°) for the films subjected to no MDO up to a 4.5 draw ratio. Films subjected to MD orientation show significant decrease in the total haze (%) and an increase in gloss (45°). The decrease in haze can be noted in both MDO films with a gauge before MDO of 50 μm and 80 μm. At 4.5 MDO draw ratio, for the Exceed XP 8656ML films (example E8), a high gloss up to 69% can be reached.

TABLE 9

Optical Haze and Gloss (45°) of films at various MDO draw ratios

| | | Film gauge before MDO = 50 μm | | | | | Film gauge before MDO = 80 μm | | | | |
|---|---|---|---|---|---|---|---|---|---|---|---|
| Exceed XP 8656ML | | C1 | E1 | E2 | E3 | E4 | C2 | E5 | E6 | E7 | E8 |
| MDO Draw Ratio | | none | 1.5 | 2.5 | 3.5 | 4.5 | none | 1.5 | 2.5 | 3.5 | 4.5 |
| Haze | % | 28 | 25 | 15 | 7 | 7 | 32 | 23 | 15 | 9 | 5 |
| Gloss (45°) | | 25 | 22 | 43 | 62 | 69 | 30 | 42 | 41 | 54 | 69 |
| Dowlex 2045G | | C3 | E9 | E10 | E11 | E12 | C4 | E13 | E14 | E15 | E16 |
| MDO Draw Ratio | | none | 1.5 | 2.5 | 3.5 | 4.5 | none | 1.5 | 2.5 | 3.5 | 4.5 |
| Haze | % | 21 | 20 | 12 | 5 | 3 | 20 | 19 | 12 | 7 | 4 |
| Gloss (45°) | | 35 | 42 | 49 | 72 | 76 | 46 | 46 | 47 | 63 | 78 |
| Exceed 1018HA | | C5 | E17 | E18 | E19 | E20 | C6 | E21 | E22 | E23 | E24 |
| MDO Draw Ratio | | none | 1.5 | 2.5 | 3.5 | 4.5 | none | 1.5 | 2.5 | 3.5 | 4.5 |
| Haze | % | 35 | 34 | 26 | 20 | 14 | 22 | 28 | 22 | 17 | 10 |
| Gloss (45°) | | 22 | 35 | 28 | 36 | 55 | 46 | 27 | 40 | 38 | 58 |

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All documents described herein are incorporated by reference herein, including any priority documents and/or testing procedures to the extent they are not inconsistent with this text, provide however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A machine direction oriented (MDO) polymer film obtained by:
   stretching a polymer film having a gauge of from 11 to 120 μm and comprising at least one layer comprising 50 to 100 wt. % of an ethylene-based polymer having:
   i. a melt index ($I_{2.16}$) of from about 0.1 g/10 min to about 10.0 g/10 min;
   ii. a melt index ratio ($I_{21.6}/I_{2.16}$) of from about 15 to about 45;
   iii. a weight average molecular weight ($M_w$) of from about 20,000 to about 200,000;
   iv. a molecular weight distribution ($M_w/M_n$) of from about 2.0 to about 5.0;
   v. a $M_z/M_w$ ratio of from 1.7 to about 3.5; and
   vi. a density of from 0.900 to 0.925 g/cm$^3$,
   wherein:
   stretching is performed at a temperature less than the melting point of the polymer to a MDO draw ratio of from 11 to 6.0 sufficient to produce the MDO polymer film; and
   the MDO polymer film has a gauge from 10 to 20 μm and a normalized MD Elmendorf Tear of at least 40 g/μm.

2. The MDO film of claim 1, further having a normalized Dart A Impact Strength ≥20 g/μm.

3. The MDO film of claim 2, wherein the film has a normalized Dart A Impact Strength ≥28 g/μm for a MDO draw ratio of 1.5 to 4.5.

4. The MDO film of claim 1, wherein the normalized MD Elmendorf Tear is at least 80 g/μm.

5. The MDO film of claim 1, wherein the MDO polymer film of 11 μm to 25 μm thickness has a MD Elmendorf Tear greater than 6400 g.

6. The MDO film of claim 1, wherein the normalized TD Elmendorf Tear is at least 80 g/μm and the normalized MD Elmendorf Tear is at least 80 g/μm.

7. The MDO film of claim 1, wherein the MDO polymer film has both a MD Elmendorf tear and a TD Elmendorf tear that are greater than 6400 g.

8. The MDO film of claim 1, wherein the MDO polymer film has both a MD Elmendorf tear and a TD Elmendorf tear that are greater than 6400 g for a thickness of 15 μm to 25 μm.

9. The MDO film of claim 1, further having a Tensile Break Elongation that is ≥50%.

10. The MDO film of claim 1, further having a peak puncture force ≥2500 mN and/or a normalized peak puncture force ≥90 mN/μm.

11. The MDO film of claim 1 having a hafnium:zirconium (ppm/ppm) ratio ≥1.0.

12. The MDO film of claim 1, wherein the ethylene-based polymer has a CDBI of from 20% to 35%.

13. A method to produce a machine direction oriented (MDO) polymer film comprising:
    stretching a polymer film having a gauge of from 11 to 120 μm at a temperature less than the melting point of the polymer to a MDO draw ratio of from 1.1 to 6.0 sufficient to produce the MDO polymer film, wherein:
    the polymer film comprises at least one layer comprising 50 to 100 wt. % of an ethylene-based polymer having:
    i. a melt index ($I_{2.16}$) of from about 0.1 g/10 min to about 10.0 g/10 min;
    ii. a melt index ratio ($I_{21.6}/I_{2.16}$) of from about 15 to about 45;
    iii. a weight average molecular weight ($M_w$) of from about 20,000 to about 200,000;
    iv. a molecular weight distribution ($M_w/M_n$) of from about 2.0 to about 5.0;
    v. a $M_z/M_w$ ratio of from 1.7 to about 3.5; and
    vi. a density of from 0.900 to 0.925 g/cm$^3$;
    the MDO polymer film has a gauge of from 10 to 20 μm and a normalized MD Elmendorf Tear of at least 40 g/μm.

14. The method of claim 13, wherein the MDO polymer film has a normalized MD Elmendorf Tear of at least 80 g/μm, and (b) a normalized TD Elmendorf Tear of at least 80 g/μm.

15. The method of claim 13, wherein the MDO polymer film of 11 g/μm to 25 g/μm thickness has a MD Elmendorf Tear greater than 6400 g.

16. The method of claim 13, wherein the MDO polymer film has both a MD Elmendorf tear and a TD Elmendorf tear that are greater than 6400 g for a thickness of 15 μm to 25 μm.

17. The method of claim 13, wherein the MDO polymer film has both a MD Elmendorf tear and a TD Elmendorf tear that are greater than 6400 g.

18. The method of claim 13, wherein the MDO polymer film has both a MD Elmendorf tear and a TD Elmendorf tear that are greater than 6400 g for a thickness of 15 μm to 25 μm.

19. The method of claim 13, wherein the polymer film gauge before machine direction orientation is 10 to 120 μm.

20. The method of claim 13, wherein the polymer film gauge before machine direction orientation is ≤50 μm.

21. The method of claim 20, wherein the polymer film gauge before machine direction orientation is 25 to 40 μm.

22. The method of claim 13, wherein the MDO polymer film further has the following properties: a normalized Dart A Impact Strength≥20 g/μm, a normalized Dart A Impact Strength≥28 g/μm for a MDO draw ratio of 1.5 to 4.5, and a Tensile Break Elongation≥50%.

23. The method of claim 13, wherein the ethylene-based polymer has a hafnium:zirconium (ppm/ppm) ratio≥1.0.

24. The method of claim 13, wherein the ethylene-based polymer has a CDBI of from 20% to 35%.

* * * * *